United States Patent [19]

Fiocco

[11] Patent Number: 4,748,006
[45] Date of Patent: May 31, 1988

[54] EXTRACTOR APPARATUS

[75] Inventor: Robert J. Fiocco, Summit, N.J.

[73] Assignee: Exxon Research and Engineering Company, Florham Park, N.J.

[21] Appl. No.: 816,274

[22] Filed: Jan. 6, 1986

[51] Int. Cl.$^4$ .............................................. B01D 11/04
[52] U.S. Cl. ..................................... 422/256; 422/257
[58] Field of Search ................................ 422/257-259, 422/256; 210/634

[56] References Cited

U.S. PATENT DOCUMENTS

| | | | |
|---|---|---|---|
| 4,057,224 | 11/1977 | Muller et al. | 422/257 X |
| 4,588,563 | 5/1986 | Fiocco | 422/256 |
| 4,634,578 | 1/1987 | Fiocco | 422/257 |

Primary Examiner—Tom Wyse
Attorney, Agent, or Firm—Joseph J. Dvorak

[57] ABSTRACT

The present invention is predicated on the discovery that emulsion prone zones generally occur in extractors at the end or region where feed is introduced and spent solvent is withdrawn. The build-up of feed droplets in this zone occurs because of slow coalescence rate, higher liquid loadings, lower interfacial tension, smaller density difference, and the like, in this zone. Accordingly, the present invention, in its simplest sense comprises a vertical extractor column having a settling zone located at one end of a mixing zone and having coalescence media located in the settling zone. Importantly, the coalescence media is positioned so as to promote the drainage of coalesced droplets to the side of the extractor where they drain back into the mixing zone. Preferably weir means are located in the settling zone between the coalescence media and the mixing zone for collecting coalesced droplets. A valve and conduit are provided for optional removal or cycling of at least some of coalesced droplets to a region in the mixing zone other than the emulsion prone zone therein.

9 Claims, 1 Drawing Sheet

EXTRACTOR APPARATUS

BACKGROUND OF THE INVENTION

This invention relates to extractors useful for liquid extraction processes. In particular, the present invention relates to the combination of features for improving the capacity and/or mass transfer efficiency of extractors, especially reciprocating plate extractors.

Solvent extraction processes are well established techniques in the petroleum, pharmaceutical and chemical industries. Indeed, a wide variety of liquid-liquid extraction columns are known in the art. Some of these extractors have fixed internals composed of various types of sieve trays having associated therewith coalescence media, collector-coalescor plates and the like. Some extractors are designed to impart mechanical agitation to the liquids flowing through the extractor in an attempt to improve the mass transfer efficiency of such extractors. For example, pulsating energy is one technique that has been employed for obtaining a high rate of mass transfer in a liquid-liquid extractor. More recently, some extractors have been designed which have reciprocating plates to introduce mechanical agitation since reciprocating plates are more energy efficient than pulsating type extractors columns.

Emulsion formation is a problem associated with all of these types of extractors. For example, the flow limiting phenomena in reciprocating plate extractors results from a build-up or formation of an emulsion of close-packed droplets in certain zones between the plates in the extractor. These emulsion droplets eventually progress through the wrong end of the column and in such instances the extractor is said to be flooded.

In the past, several techniques have been employed to deal with the emulsion phenomena. Thus, for example, to optimize the capacity of reciprocating plate extractors, the technique of increasing the plate spacing in emulsion prone zones of the extractor while providing for smaller spacing between the plates in the balance of the reciprocating plate extractor has been employed.

None of the techniques employed to deal with emulsions has been totally satisfactory, however. Consequently, there remains a need for improved extractors that overcome some of the problems associated with emulsion formation in these extractors. With respect to reciprocating plate extractors, for example, there remains a need for such extractors which have a greater flow capacity than presently achieved with reciprocating plate extractors.

SUMMARY OF THE INVENTION

The present invention is predicated on the discovery that emulsion prone zones generally occur in extractors at the end or region where feed is introduced and spent solvent is withdrawn. The build-up of feed droplets in this zone occurs because of slow coalescence rate, higher liquid loadings, lower interfacial tension, smaller density difference, and the like, in this zone. Accordingly, the present invention, in its simplest sense comprises a vertical extractor column having a mixing zone and at least one settling zone. The settling zone is located generally at the end of the extractor where feed is introduced and spent solvent is withdrawn. Coalescence media is located in the settling zone. Importantly, the coalescence media is positioned so as to promote the drainage of coalesced droplets outwardly to the side of the column where they ultimately drain back into the mixing zone. Preferably weir means are located in the settling zone between the coalescence media and the mixing zone for collecting coalesced droplets draining from the coalescence media. A valve and conduit are provided for optional removal or cycling of at least some of coalesced droplets to a region in the mixing zone other than the emulsion prone zone therein.

In a particularly preferred embodiment of the present invention, the extractor is a reciprocating plate extractor. Additionally, although optionally, means are provided for reducing the mixing energy in the emulsion prone zone, for example, by making the plates in the emulsion prone zone smaller in diameter and providing them with greater open area than the plates in other zones.

In yet another embodiment of the present invention, multiple feed inlets are provided so the loading of the fluids in the various zones can be adjusted so that the liquid-loading in the emulsion prone zone is reduced and each zone within the extractor column is operating at greater efficiency and capacity.

These and other important features of the present invention will become readily apparent upon a reading of the detailed description in conjunction with the drawings.

DETAILED DESCRIPTION OF THE INVENTION

In the detailed description which follows specific reference is made to reciprocating plate extractors. It should be appreciated, however, that the present invention is not intended to be limited to such extractors but is equally applicable to extractors having at least an upper settling section above a mixing section and that reference to reciprocating plate extractors is for convenience. Also, in the following detailed description for convenience the underlying principles of the extractor of the present invention are described in connection with a process involving a heavy discontinuous phase and a light continuous phase. As will be readily appreciated, however, the principles described herein are equally applicable to extractors for processing discontinuous light phase with a heavy continuous phase.

Figure 1:
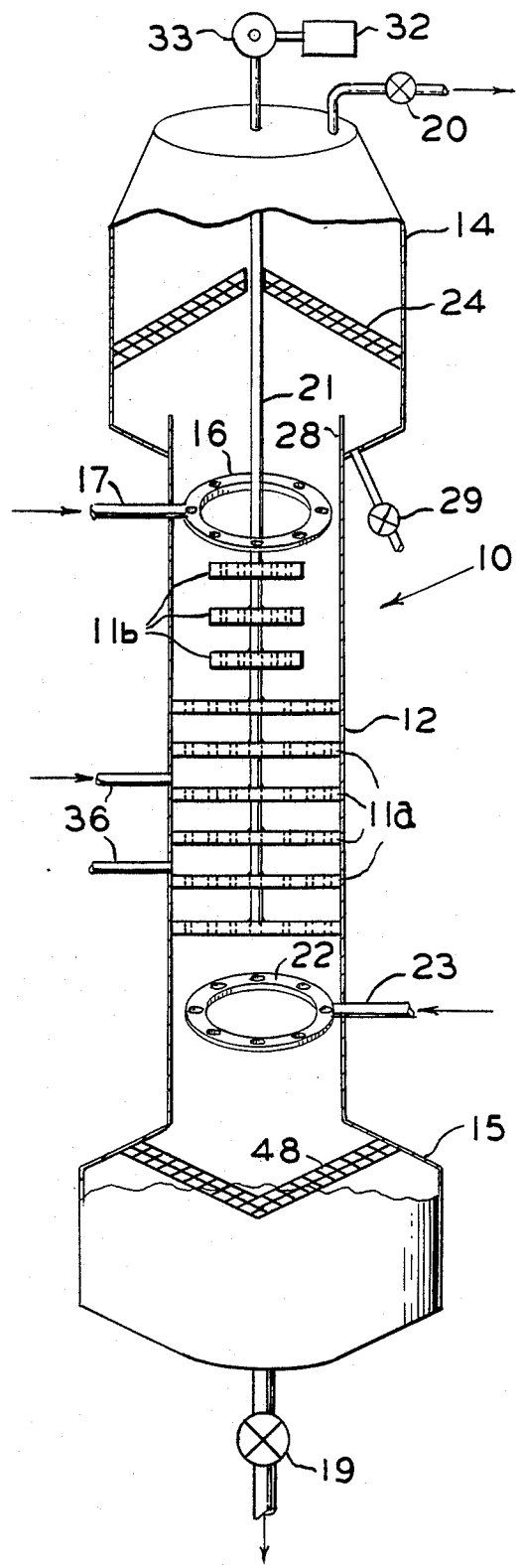
FIG. 1 is a side elevational view and section of a reciprocating plate extractor in accordance with one embodiment of the present invention.

Referring now to FIG. 1 of the drawings, reference number 10 designates an extractor which is provided with a mixing zone having a plurality or stack of perforated plates 11a and 11b horizontally arranged within the vertical shell 12 of the column proper of extractor 10. As can be seen from FIG. 1, extractor 10 includes an upper settling section 14 to separate any droplets of feed entrained in the exiting solvent and a lower settling section 15 to separate any solvent droplets from the coalesced droplet phase before withdrawing coalesced extracted feed. In the FIG. 1 embodiment, the settling sections 14 and 15 are shown as having larger diameters than the diameter of the column proper; however, the diameter of the settling sections optionally may be the same as the diameter of the column proper.

Also, as can be seen in FIG. 1 a distributor 16 attached to an inlet 17 for the introduction of the dispersed or discontinuous phase feed into the extractor 10 is located in the extractor below the upper settling section 14 and above the mixing zone of the extractor with its various reciprocating plates 11a and 11b. Optional additional conduits 36 are provided for introduction of the dispersed or discontinuous phase into extractor 10 in a region other than the emulsion prone zone in the extractor. The upper settling zone 14 is provided with an outlet means 20 through which the continuous phase, such as the light phase, can be removed after its passage through the column proper of extractor 10. The lower settling zone 15 contains an outlet 19 for the removal of the dispersed phase and a distributor 22 communicating with an inlet line 23 for the introduction of the light solvent continuous phase.

A stack of perforated plates 11a and 11b are horizontally disposed in the mixing zone of extractor 10 and are fastened to a rod 21 which in turn is connected to an eccentric 33 driven by motor 32 that imparts a harmonic motion to the stack of plates. It is this harmonic motion that promotes and enhances intimate contact of the liquids flowing through the reactor.

Importantly, in the practice of the present invention coalescence media 24 is located in the settling zone 14 above the mixing zone where the reciprocating plates are located. This coalescence media 24 may be selected from a wide range of materials such as wire mesh screen packing and other fibrous materials such as fiberglass, polypropylene and the like. In the practice of the present invention, it is particularly preferred that the coalescence media 24 be disposed such that the continuous phase will pass through the media and is also arranged at an angle so that it extends substantially to the wall of the settling zone and slopes from the vertical axis of the extractor 10 toward the mixing zone. In general, the coalescence media 24 will be sloped at an angle of about 5° to about 60° and preferably at about 30° with respect to the horizontal.

Preferably, the upper settling zone 14 also is provided with a weir 28 which serves to collect coalesced droplets draining down the vessel wall and over which the coalesced fluid overflows on its passage or return to the mixing zone. As shown, weir 28 extends upwardly from the vertical mixing column into the enlarged settling zone 14 and is concentric therewith. The weir 28 together with the sloping wall of the settling zone define an annular region for collection of the coalesced fluid in said settling until it overflows said weir. Additionally means 29 is provided for optional removal of at least a portion of coalesced liquid collected behind weir 28 or the optional removal of at least a portion of the coalesced liquid collected behind weir 28 and subsequent reintroduction of the removed liquid into a region of the extractor 10 other than the emulsion prone zone via feed inlets 36. In this way, gravity forces promote drainage of coalesced fluid to the outside wall thereby avoiding random dripping of the fluid.

Also in the practice of the present invention means are provided in the column proper for reducing the mixing energy in the emulsion prone zone within the column. In the embodiment shown in FIGS. 1 and 2, the means for reducing the mixing energy in the emulsion prone zone consist of the use of plates 11b which have a diameter smaller than the diameter of the balance of plates in the column proper, viz. plates 11a. In this way coalesced droplets near the walls of the column proper may flow more easily through the emulsion prone zone. Also in this way, the stroke frequency and stroke length of plate connecting rod 34 which is actuated by motor 32 and eccentric 33 need not be decreased in order to achieve a reduced energy in the emulsion prone zone.

Figure 2:
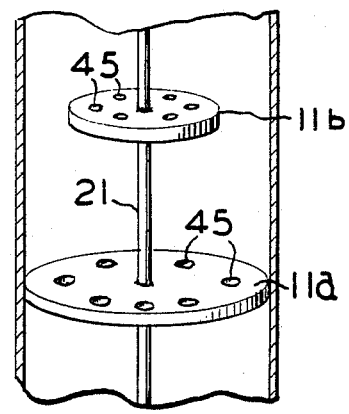
FIG. 2 is a sectional view partly in perspective showing in greater detail one particular means of reducing the mixing energy in an emulsion prone zone in accordance with the present invention.

Referring now to FIG. 2, it can be seen that the plates 11a and 11b are provided with a plurality of apertures 45 through which the dispersed phase and alternately the continuous phase liquid flows. The plates 11b, in the emulsion prone zone, are smaller than plates 11a. Also, optionally and preferably the number of apertures in plate 11b are greater than number of apertures in plate 11a. For example, the diameter of the apertures and the number of apertures in plates 11b may be about 50% greater than in plates 11a. In other words, the plates in the emulsion prone zone are made not only smaller in diameter but also are provided with more open area than plates in the other zones thereby reducing the mixing energy in the emulsion prone zone.

Figure 3:
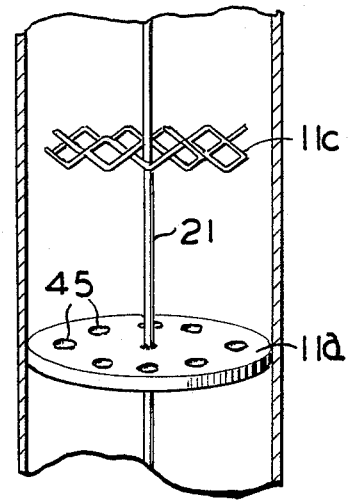
FIG. 3 is a sectional side elevation showing another embodiment of an extractor of the present invention in which the plates in the emulsion prone zone of the extractor column are made of an expanded metal so as to reduce the mixing energy in that zone.

Referring now to the embodiment shown in FIG. 3, the plates in the emulsion prone zone are fabricated from other material such as an expanded metal or wire mesh screen and are designated as 11c. By using horizontally disposed expanded metal mesh screens as the reciprocating plate mechanism in the emulsion prone zone, the mixing energy in that zone is less than that obtained by using plates with apertures.

In yet another embodiment of the present invention, a plurality of inlets are provided in the column proper so that the loading of the feed in the various zones within the column proper can be adjusted so that each part of the extractor is operating at higher efficiency and capacity. These inlets are shown in FIG. 1 by the portions bearing reference numeral 36.

It is an optional feature of the present invention to include coalescence media 48 in the settling zone 15 below the mixing zone and below distributor 22. The coalescence media 48 is disposed in the direction of downward flow of the discontinuous phase and is arranged at an angle so that it slopes upwardly and outwardly from the vertical axis of the extractor 10 thereby promoting coalescence and separation of the two phases. The angle of incline from the horizontal is from about 5° to 60° and preferably about 30°.

It should be readily appreciated that the extractor of the present invention is particularly suitable for extraction processes such as lube oil production, aromatics recovery and alcohol extraction from sulfuric acid.

What is claimed is:

1. In a vertical wall liquid-liquid extractor of the type having a mixing zone wherein means are provided for dispersing a first fluid in a second fluid, said mixing zone having a first end and a second end, at least one settling zone located at said first end of said mixing zone wherein a dispersed first fluid from said mixing zone is separated from said second fluid for removal of said second fluid, said extractor having inlet means located between said first end of said mixing zone and said settling zone for introduction of a first fluid for dispersed flow through said extractor and outlet means at said second end of said mixing zone for removal thereof, and said extractor having inlet means at said second end of said mixing zone for the introduction of a second fluid for flow through said extractor and outlet means in said settling zone for removal of said second fluid, the improvement comprising: coalescence media located in said settling zone between said inlet means for said first fluid and said outlet means for said second fluid, said coalescence media being disposed across the flow path of said second fluid and arranged at an angle so that it slopes from the vertical axis of the extractor in the direction of the mixing zone and extends substantially to the wall of said settling zone, whereby emulsified fluid passing therethrough will be coalesced and said coalesced fluid will drain toward the wall of the extractor and thence to said mixing zone.

2. The improvement of claim 1 including weir means positioned in said settling zone between said coalescence media and said mixing zone and behind which weir means coalesced fluid is collected until it overflows said weir.

3. The improvement of claim 2 including means for removal of at least a portion of the coalesced liquid collected behind said weir means.

4. The improvement of claim 3 including means for introducing at least a portion of the coalesced liquid collected and removed from behind the weir means to said mixing zone other than an emulsion prone zone therein.

5. The improvement of claim 2 wherein said coalescence media is sloped at an angle of about 5° to about 60° with respect to the horizontal plane through said reactor extractor.

6. The improvement of claim 5 wherein said angle is about 30°.

7. The improvement of claim 4 wherein said reactor is a reciprocating plate extractor having a plurality of horizontally disposed perforated plates for reciprocating motion in said mixing zone.

8. The improvement of claim 7 wherein the plates located in the emulsion prone zone of the mixing zone having a diameter less than the diameter of the remaining plates.

9. The improvement of claim 7 wherein the extractor includes a second settling zone located at said second end of said mixing zone, said second settling zone having coalescence media located therein and located across the flow path of said first fluid and sloped in the direction of said mixing zone whereby emulsified fluid passing therethrough will be coalesced and the coalesced fluid will drain to the wall of the extractor and thence to said mixing zone.

* * * * *